No. 845,127. PATENTED FEB. 26, 1907.
F. J. SCHIELE.
STEERING GEAR.
APPLICATION FILED MAR. 31, 1906.
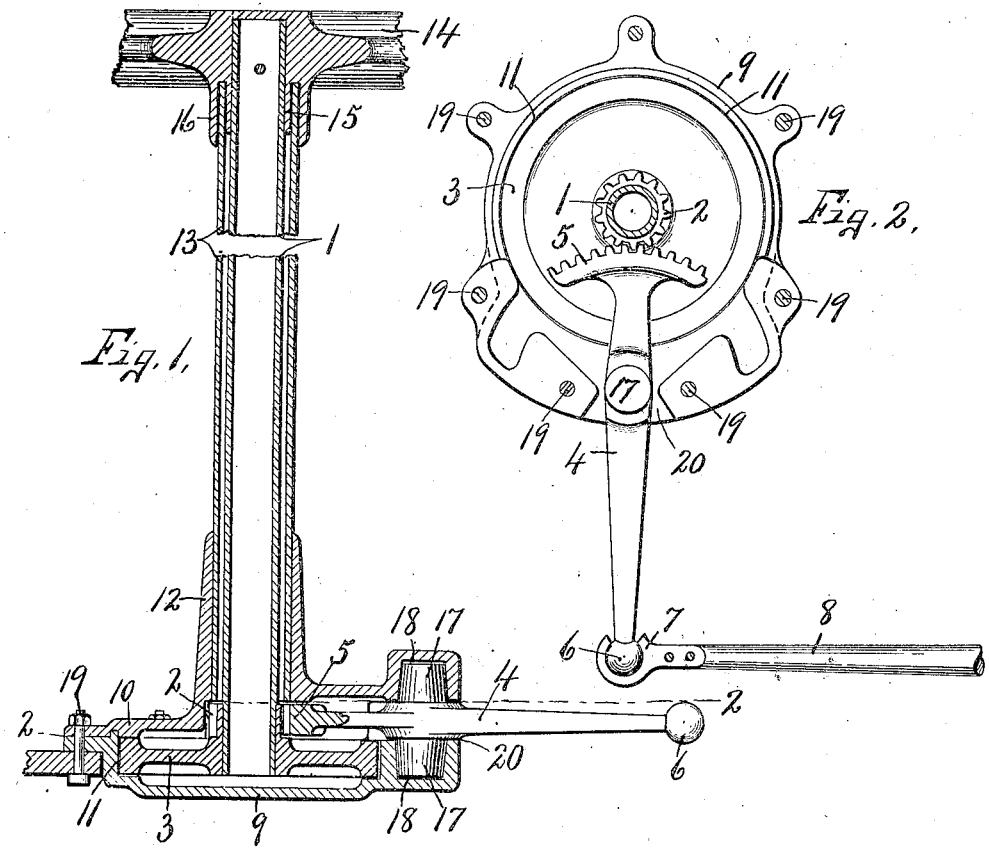
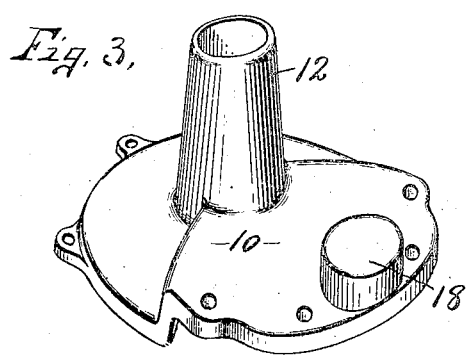
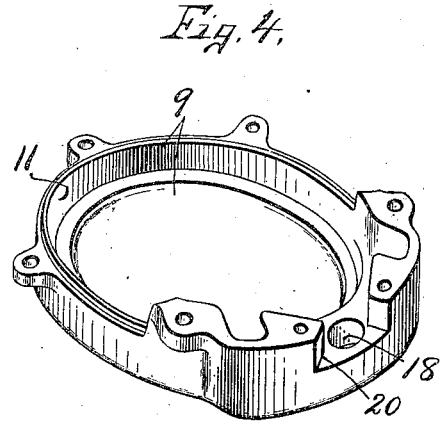
Witnesses:
F. E. Arthur
A. C. Thomas
Inventor:
F. J. Schiele
By Howard P. Denison
Attorney.

UNITED STATES PATENT OFFICE.

FREDERICK J. SCHIELE, OF SYRACUSE, NEW YORK.

STEERING-GEAR.

No. 845,127.  Specification of Letters Patent.  Patented Feb. 26, 1907.

Application filed March 31, 1906. Serial No. 309,206.

*To all whom it may concern:*

Be it known that I, FREDERICK J. SCHIELE, of Syracuse, in the county of Onondaga, in the State of New York, have invented new and useful Improvements in Steering-Gear, of which the following, taken in connection with the accompanying drawings, is a full, clear, and exact description.

This invention relates to certain improvements in steering-gear for self-propelled vehicles involving the use of a rack and pinion and suitable connections for transmitting motion from the steering-post to the steering-wheels of the vehicle, in combination with an automatic friction-brake for preventing retroaction of the steering post and wheels. In this class of devices it is desirable to provide means for preventing, as far as practicable, undue vibration or oscillation of the steering-wheels and their controlling mechanisms, as the steering-post and hand-wheel, so that when the steering-wheels are once set to travel in one direction—as, for instance, straightaway—they will be automatically retained in such position until further adjusted by the steering-wheel.

My object, therefore, is to produce a simple, practical, and efficient steering-gear which may be easily and quickly adjusted to shift the wheels to any desired angle and which, together with the wheels, are automatically held in their adjusted position against retroaction. In other words, I have sought to utilize this tendency toward retroaction to instantly throw into action a friction retarding device or brake to prevent undue oscillation of the steering-wheels from their adjusted position and to thereby relieve in a measure the operator from continued watchfulness and strenuous grip upon the hand-wheel.

Another object is to provide a steering-gear with as few parts and flexing joints as may be practicable, so as to reduce the cost of manufacture and at the same time to increase the durability and working efficiency of the operating parts.

Other objects relating to the specific structure and arrangement of the parts of the steering-gear will be brought out in the following description.

In the drawings, Figure 1 is a vertical sectional view, partly broken away, of a steering-gear embodying the features of my invention. Fig. 2 is a horizontal sectional view taken on line 2 2 of Fig. 1. Figs. 3 and 4 are perspective views, respectively, of the upper and lower gear-case sections.

The operating parts of my improved steering-gear comprise, essentially, an upright steering-post 1, a pinion 2, and brake-wheel or friction-disk 3, both of which are secured to the lower end of the steering-post 1, and a lever 4, having at one end a toothed segment 5, meshing with the pinion 2, while its other end is provided in this instance with a ball 6 for receiving a split socket 7 on a link 8, which latter is adapted to be connected in any desired manner to the steering-wheels. (Not shown.)

The pinion 2 and friction-disk or brake-wheel 3, together with the adjacent ends of the steering-post 1 and lever 4, are inclosed in a suitable gear-case, comprising a lower section 9 and an upper section 10, both of which are preferably made of cast metal and are substantially circular in general outline and concentric with the axis of the steering-post.

The lower gear-case section 9 is formed with an annular bearing or friction face 11, concentric with the axis of the steering-post and of substantially the same diameter as that of the disk 3. The pinion 2 and disk 3 are rigidly united and are preferably cast integral with each other and rigidly secured to the lower end of the steering-post 1 between the lower and upper gear-case sections 9 and 10, the disk 3 having a snug but easy running fit with the annular bearing 11 and is the only means for retaining the lower end of the steering-post against radial vibration—that is, the lower end of the steering-post with the disk and pinion thereon is free to move radially as much as the disk 3 and its coacting bearing-face 11 will permit, so that if any radial pressure is applied to the disk toward the axis of the post the diametrically opposite face of such disk will be pressed with the same degree of force against the adjacent bearing-face 11. It is evident, however, that when the steering-post is rotated about its axis the annular face 11 forms a concentric bearing for the disk 3, and consequently steadies the lower end of the steering-post in its rotation.

The upper gear-case section 10 is fitted upon and secured to the top face of the lower section 9 and is provided with a central upwardly-projecting hollow boss 12, in which is rigidly secured an upwardly-projecting tubular casing 13, having a greater interior diameter than the exterior diameter of the steering-post, so as to leave an intervening space communicating with the interior of the gear-case, said tube 13 forming a continuation or upward extension of the gear-case to inclose the greater portion of the steering-post. This steering-post extends some distance above the upper end of the tube, and has secured thereto a hand-wheel 14, having its hub formed with depending annular flanges 15 and 16, the flange 15 having an easy running fit within the upper end of the tube 13 and together with the outer flange 16, which has a similar easy running fit upon the exterior of the upper end of the tube 13, serve to keep the upper ends of the tube and steering-post concentric with each other. These flanges 15 and 16, however, are comparatively short, thus leaving the lower end of the steering-post free to move a sufficient distance radially to allow the friction-face of the brake-wheel 3 to be brought into frictional engagement with the bearing 11 when external radial pressure is applied to the steering-post or parts which are secured to its lower end. This radial pressure and consequent frictional engagement of the brake wheel or disk 3 against the bearing-face 11 is brought about by the tendency to retroaction of the steering-wheels through its connection with the lever 4, as will be made apparent in the following description.

The lever 4, which may be made of forged or cast metal, is provided intermediate its ends with opposite integral bosses or trunnions 17, which fit in suitable sockets 18 in the meeting faces of the lower and upper gear-case sections 9 and 10, thereby avoiding the use of pivotal bolts and enabling the lever to be readily clamped between the two gear-case sections, which are secured together by suitable fastening means, as bolts 19.

The toothed rack or segment 5 is preferably integral with the lever 4 and concentric with the axis of the said lever, with its teeth in mesh with the pinion 2, while the opposite end of the said lever extends some distance outside of the gear-case through a suitable opening 20 in the lower case-section 9, and is provided with a terminal end, as the ball 6, for attachment to the draw-rod 8.

It is now obvious that by rotating the steering-post 1 by means of the hand-wheel 14 the disk 3 or brake-wheel is similarly rotated upon the same axis, it being held in this position by its running fit with the bearing 11, and the pinion 2 is therefore rotated with a minimum resistance to transmit oscillatory motion to the lever 4, such action being rendered easier by reason of the fact that the pinion is usually of less pitch diameter than the rack 5, with which it meshes, thereby enabling the wheels to be turned or adjusted at will with a comparatively light power. On the other hand, any tendency toward retroaction of the wheels from their adjusted position, as in passing over obstacles or rough pavements, applies a lateral pressure upon the outer end of the lever 4 through the medium of the link or draw rod 8, which in turn produces a tangential and radial pressure upon the gear or pinion 2 through the medium of the teeth or the rack 5 intermeshing therewith, and this tangential and radial pressure forces the periphery of the disk or brake-wheel 3 into frictional engagement with the annular bearing-face 11, such pressure being in direct proportion to the power operating to turn the wheels from their adjusted position, thereby frictionally resisting the tendency of the wheels to turn from such adjusted positions. This resistance is particularly effective when one or the other of the wheels encounters an obstruction, because the force of impact of the wheels with such obstruction is instantly transmitted to the disk to force the latter into frictional engagement with the annular bearing-face 11; but I have discovered that even when a constant pressure is applied to turn the wheels from their adjusted position the tangential or radial pressure which is brought to bear upon the pinion presses the disk against the bearing 11 with sufficient force to effectually resist such turning, and I therefore believe that I am the first to combine a friction-disk with a rack-and-pinion action of a steering mechanism in such manner that the disk may turn freely when actuated by the steering-post and operates to resist retroaction when the power is applied to the wheels of the vehicle to turn them from their adjusted position.

What I claim is—

1. In a steering-gear, a rotary steering-post and a concentric disk secured thereto and having a peripheral friction-face, a fixed annular bearing forming a friction-face for the periphery of the disk, a pinion secured to the steering-post and a toothed rack engaged by the pinion.

2. In a steering mechanism a fixed annular bearing, a rotary friction-disk having its periphery engaging said bearing, a steering-post operatively connected to said disk for actuating the same, a pinion rotated by the steering-post and a rock-arm actuated by the pinion.

3. In a steering mechanism, the combination with a rack and pinion intermeshing with each other, of a friction-disk secured to one of the aforesaid parts, a fixed bearing for the friction-disk and a steering-post connected to and actuating the pinion and disk.

4. In a steering mechanism a fixed bearing having an annular friction-face, a rotary disk having its periphery engaging said face, a pinion, a steering-post for rotating said pinion and disk, and a lever having a toothed rack engaged with the pinion.

5. In a steering mechanism a gear-case composed of sections, a lever having an integral boss journaled in one of the sections, a steering-post and means for transmitting motion from the steering-post to the lever.

6. In a steering mechanism a gear-case, a tube secured to the case and projecting upwardly therefrom, a steering-post journaled at its upper end upon the tube and having its lower end free to move laterally in the case, a friction-bearing in the case, and a friction-disk on the lower end of the steering-post within the case and having its periphery engaged with said friction-bearing.

In witness whereof I have hereunto set my hand on this 28th day of March, 1906.

FREDERICK J. SCHIELE.

Witnesses:
F. E. ARTHUR,
H. E. CHASE.